(12) United States Patent
Kuribayashi

(10) Patent No.: US 11,480,785 B2
(45) Date of Patent: Oct. 25, 2022

(54) OPTICAL APPARATUS AND LIGHT-PROPAGATION-DIRECTION CONTROLLER

(71) Applicant: JAPAN AEROSPACE EXPLORATION AGENCY, Tokyo (JP)

(72) Inventor: Ryosuke Kuribayashi, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 93 days.

(21) Appl. No.: 17/152,334

(22) Filed: Jan. 19, 2021

(65) Prior Publication Data

US 2021/0223540 A1 Jul. 22, 2021

(30) Foreign Application Priority Data

Jan. 20, 2020 (JP) .............................. JP2020-007031

(51) Int. Cl.
| | |
|---|---|
| *G02B 26/08* | (2006.01) |
| *G02B 19/00* | (2006.01) |
| *G02B 27/30* | (2006.01) |
| *H02J 50/30* | (2016.01) |

(52) U.S. Cl.
CPC ..... *G02B 26/0875* (2013.01); *G02B 19/0028* (2013.01); *G02B 27/30* (2013.01); *H02J 50/30* (2016.02)

(58) Field of Classification Search
CPC . G02B 26/0875; G02B 19/0028; G02B 27/30
See application file for complete search history.

(56) References Cited

U.S. PATENT DOCUMENTS

| | | | | |
|---|---|---|---|---|
| 5,513,201 A | * | 4/1996 | Yamaguchi | ........ G02B 27/0972 372/75 |
| 2003/0142197 A1 | * | 7/2003 | Donner | .................. G03B 27/46 347/241 |
| 2005/0063435 A1 | * | 3/2005 | Imai | .................... G02B 27/0955 372/101 |

FOREIGN PATENT DOCUMENTS

WO WO-2020054043 A1 * 3/2020

OTHER PUBLICATIONS

English translation of Matsui WO-2020054043-A1, published Mar. 2020 (Year: 2020).*

(Continued)

*Primary Examiner* — Evan P Dzierzynski
(74) *Attorney, Agent, or Firm* — Saliwanchik, Lloyd & Eisenschenk

(57) ABSTRACT

An optical apparatus includes: a condensing optical part having a focal point; and an optical element that is inserted between the condensing optical part and the focal point and capable of shifting, in a direction perpendicular to an optical axis, the apparent focal point as viewed from a side of the condensing optical part.

14 Claims, 15 Drawing Sheets

(56) References Cited

OTHER PUBLICATIONS

Kaymak, Y. et al., "A Survey on Acquisition, Tracking, and Pointing Mechanisms for Mobile Free-Space Optical Communications," *IEEE Communications Surveys & Tutorials*, 2018, 20(2):1104-1123, IEEE.

Jigang, H. et al., "Two Dimensional Laser Galvanometer Scanning Technology for Additive Manufacturing," *International Journal of Materials, Mechanics and Manufacturing*, Oct. 2018, 6(5):332-336.

Holmström, S. T. S. et al., "MEMS Laser Scanners: A Review," *Journal of Microelectromechanical Systems*, Apr. 2014, 23(2):259-275, IEEE.

Hara, T., "The Latest Advance in Liquid Crystal Spatial Light Modulators," *Optics*, 2007, 36(122):122-128, with English abstract.

\* cited by examiner

OPTICAL APPARATUS AND LIGHT-PROPAGATION-DIRECTION CONTROLLER

CROSS REFERENCE TO RELATED APPLICATION

This application claims the benefit of Japanese Application No. 2020-007031, filed Jan. 20, 2020, which is hereby incorporated by reference in its entirety.

BACKGROUND

The present disclosure relates to an optical apparatus used as a light-propagation-direction controller or a selector for controlling the direction of light transmission or light reception with high accuracy in an optical transmitter or an optical receiver of free space light.

The present disclosure relates to a light-propagation-direction controller including such an optical apparatus.

Recently, with the rapid development of laser applications such as light detection and ranging (LIDAR), free-space optical communication, and an optical 3D printer, there is an increasing need for a light-propagation-direction controller to fix or sweep the propagation direction of light such as laser beams at high speed and high accuracy (error of milliradians or less).

Examples of the configuration of the main existing light-propagation-direction controller include those by angular control of a mirror, and those shifting the optical axis by lens position shifting or the like. For the former, a gimbal mirror (see Y. Kaymak et al., "A Survey on Acquisition, Tracking, and Pointing Mechanisms for Mobile Free-Space Optical Communications," IEEE Communications Surveys and Tutorials 20, 1104-1123 (2018)), a galvanomirror system (see H. Jigang et al., "Two Dimensional Laser Galvanometer Scanning Technology for Additive Manufacturing," International Journal of Materials, Mechanics and Manufacturing 6, 332-336 (2018)), a micro-electro-mechanical-systems (MEMS) mirror (see S. T. S. Holmstrom et al., "MEMS Laser Scanners: A Review," Journal of Microelectromechanical System 23, 259-275 (2014)), and the like are generally used. Other examples include a spatial optical modulator that includes no mechanical movable portion and changes the light propagation direction by applying spatial modulation to the phase of light (see T. Hara, "The Latest Advance in Liquid Crystal Spatial Light Modulators," Japanese journal of optics: publication of the Optical Society of Japan 36, 122-128 (2007)).

SUMMARY

The present inventors are considering laser wireless power transmission from a lunar lander to a lunar exploration rover. This is a system that wirelessly powers, using a laser beam (100 watts or more), the lunar exploration rover in the permanent shadow area, which may be more than 1 km away from the lunar lander in the sunshine area on which a photovoltaic power generation panel is mounted. The propagation direction control accuracy of the laser beam that is necessary here is several tens of microradians or less. Further, a light-propagation-direction controller is strongly desired to be small and light and have environmental resistance, vibration-proof, and the like as a request of the general spacecraft. Further, in the case of laser transmission exceeding 1 km, since the beam diameter is widened by the diffraction effect of light, the beam diameter on the light transmission side needs to be increased from ten and several mm to several tens mm or more. In the case where the above-mentioned existing light-propagation-direction controller is used for such a system, the following new problems arise.

(1) The optical propagation direction control accuracy of a gimbal mirror and a galvanomirror system is substantially determined by the performance of an actuator such as a motor, but it is difficult to realize the above-mentioned necessary accuracy with a light weight and a large diameter. Further, since twice the angular change of the mirror controlled by the actuator is the change in the light propagating direction as it is, the effect of vibration on the mirror is large.

(2) A MEMS mirror is difficult to accommodate large-diameter beams and high-power light because of the small-size.

(3) A spatial optical modulator is less tolerant of surrounding environmental fluctuation (temperatures, etc.) and high power, and a sophisticated optical phase monitoring/control technology is necessary for use.

(4) In general, a light-propagation-direction controller having high accuracy of the micro-radian class tends to be high-cost.

The present disclosure provides a configuration that solves these new problems. It is desired to provide an optical apparatus and a light-propagation-direction controller that have a small and lightweight optical system configuration, light-propagation-direction control accuracy of substantially micro-radians or less, and high environmental resistance and vibration resistance, and are capable of accommodating large-diameter beams and high-power beams, and low-cost.

According to an embodiment of the present disclosure, there is provided an optical apparatus including: a condensing optical part having a focal point; and an optical element that is inserted between the condensing optical part and the focal point and capable of shifting, in a direction perpendicular to an optical axis, the apparent focal point as viewed from a side of the condensing optical part, the optical apparatus being characterized in that a propagating direction angle of light in space on a side of the condensing optical part where the optical element is not provided is changed in accordance with an amount of the shifting.

(1) In the case where an optical parallel flat plate is used as the optical element, the accuracy and sweep pitch of the light-propagation-direction control can be adjusted by only selecting the optical thickness (=physical thickness×refractive index) of the parallel flat plate and the lens focal length, and the direction control accuracy exceeding the performance of the rotation actuator itself can be achieved. At the same time, since it is insensitive to mechanical movement of the rotation actuator as compared with the existing methods, the vibration resistance is improved in the case where the light propagation direction is controlled with the accuracy similar to that of the existing method.

(2) Since the parallel flat plate is disposed in the vicinity of the focal point, it is possible to accommodate large-diameter beams without greatly decreasing the direction control accuracy and without enlarging the area of the optical element such as the parallel flat plate. In addition, by adopting an optical parallel flat plate material that absorbs less transmission light and applying anti-reflection treatment to both surfaces of the parallel flat plate, it is also possible to ensure low optical loss and resistance to strong power light.

(3) High-accuracy control can be performed by only causing an optical element such as a simple optical parallel flat plate to pivot, and it is generally less affected by surrounding environments such as temperature and humidity.

(4) By inserting a plurality of optical elements such as optical parallel flat plates having different optical thicknesses, both high accuracy and wide range of light-propagation-direction control can be achieved.

(5) By only additionally inserting an optical element such as an optical parallel flat plate into an existing collimator or beam-diameter converter, the direction control function can be easily provided with high accuracy without greatly increasing the size and weight of the optical system.

(6) It can be configured by only adding an optical element such as an inexpensive optical parallel flat plate.

In the optical apparatus according to the embodiment of the present disclosure, the optical element includes a transmissive optical parallel flat plate that is pivotable in an axis perpendicular to the optical axis or fixed at a predetermined inclination angle and has a refractive index variable by external perturbation such as electromagnetic field application, temperature variation, and light irradiation.

In the optical apparatus according to the embodiment of the present disclosure, the condensing optical part is a collimator including one or more lenses or one or more reflecting mirrors.

In the optical apparatus according to the embodiment of the present disclosure, the reflecting mirror is a reflective telescope having a diameter of 50 mm or more.

In the optical apparatus according to the embodiment of the present disclosure, the condensing optical part is an optical relay system or a beam-diameter converter including one or more lenses, one or more reflecting mirrors, or a combination of one or more lenses and one or more reflecting mirrors.

In the optical apparatus according to the embodiment of the present disclosure, the reflecting mirror is a reflective telescope having a diameter of 50 mm or more.

In the optical apparatus according to the embodiment of the present disclosure, the parallel flat plate is pivotable in two axes perpendicular to each other.

In the optical apparatus according to the embodiment of the present disclosure, the optical element includes a first transmissive optical parallel flat plate that is pivotable about a first axis that is a rotation axis perpendicular to the optical axis or fixed at a predetermined inclination angle and has a refractive index variable by external perturbation such as electromagnetic field application, temperature variation, and light irradiation, and a second transmissive optical parallel flat plate pivotable about a second axis that is a rotation axis perpendicular to the optical axis and the first axis or fixed at a predetermined inclination angle and has a refractive index variable by external perturbation such as electromagnetic field application, temperature variation, and light irradiation.

In the optical apparatus according to the embodiment of the present disclosure, the optical element includes two or more transmissive optical parallel flat plates that are independently pivotable or fixed at a predetermined inclination angle, have a refractive index variable by external perturbation such as electromagnetic field application, temperature variation, and light irradiation, and different optical thicknesses (=physical thickness×refractive index) when there is no external perturbation.

The optical apparatus according to the embodiment of the present disclosure may further include a beam shaper disposed on a side of the condensing optical part opposite to a side where the optical element is disposed.

In accordance with the present disclosure, it is possible to realize a light-propagation-direction controller, a selector, and the like that have a small and lightweight optical system configuration, light-propagation-direction control accuracy of substantially micro-radians or less, and high environmental resistance and vibration resistance, and are capable of accommodating large-diameter beams and high-power beams, and low-cost.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

First Embodiment

Figure 1:
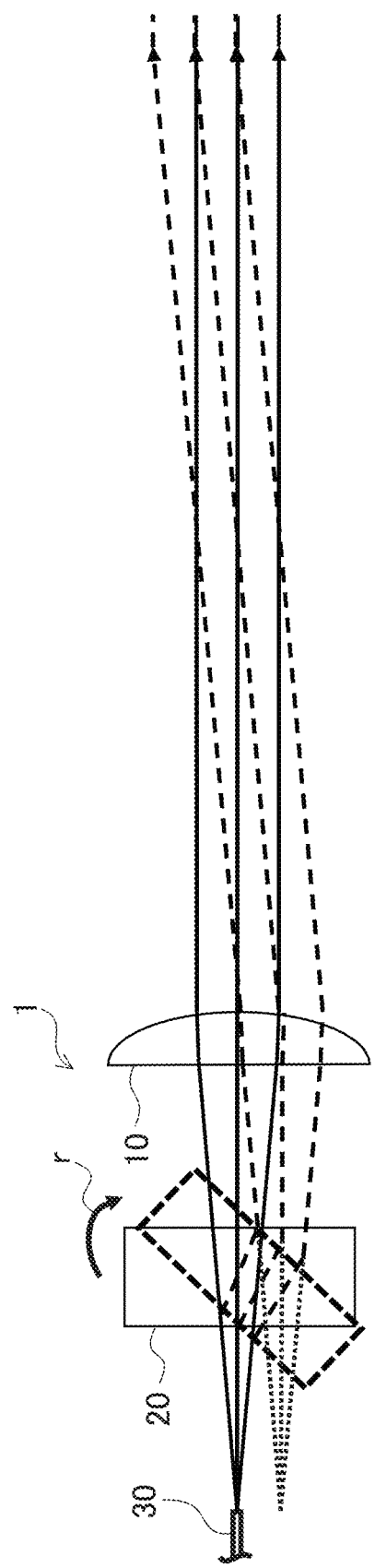
FIG. 1 is a diagram showing a configuration of an optical apparatus according to a first embodiment of the present disclosure.

FIG. 1 is a diagram showing a configuration of an optical apparatus according to a first embodiment of the present disclosure.

As shown in FIG. 1, an optical apparatus 1 is a collimator that converts a divergent beam into a collimated beam, and includes a convex lens 10, and a transmissive optical parallel flat plate 20 inserted between a laser light source 30 and the convex lens 10.

The convex lens 10 that functions as a condensing optical part makes a laser beam that is a divergent beam output from the laser light source 30 disposed at the position of the focal point of the convex lens 10 a collimated beam.

The parallel flat plate 20 is pivotably held. For example, the parallel flat plate 20 is caused to pivot in the direction indicated by the reference symbol r in the drawings and held at the position indicated by the dotted line.

The parallel flat plate 20 is held by a holding mechanism (optical element holder) (not shown) and is caused to pivot manually, for example. Alternatively, the parallel flat plate 20 is pivotably held by a rotation drive mechanism (kinematic mount for an optical element or a rotation stage) (not shown). For example, the parallel flat plate 20 may be pivotably driven under the control of a predetermined control system (a system including a stepping motor or a piezo-electric drive device) (not shown).

Such an optical apparatus 1 constitutes a light-propagation-direction controller, a selector, or the like including a Fourier transform optical system having a conversion function between a light spatial distribution and a light propagation angular distribution.

For example, in this optical apparatus 1, when the parallel flat plate 20 is caused to pivot in the direction indicated by the reference symbol r in the drawings to reach the position indicated by the dotted line, the apparent focal point as viewed from the convex lens 10 (the output end image of the laser light source 30) shifts in the direction perpendicular to the optical axis. As a result, the propagation direction of the light on the side opposite to the focal point (the output end image of the laser light source 30) with the convex lens 10 interposed therebetween is controlled. In other words, in the optical apparatus 1 according to an embodiment of the present disclosure, it is possible to control the propagation direction of the light on the opposite side with the convex lens 10 interposed therebetween by changing the angle of the parallel flat plate 20 with respect to the optical axis.

Figure 2:
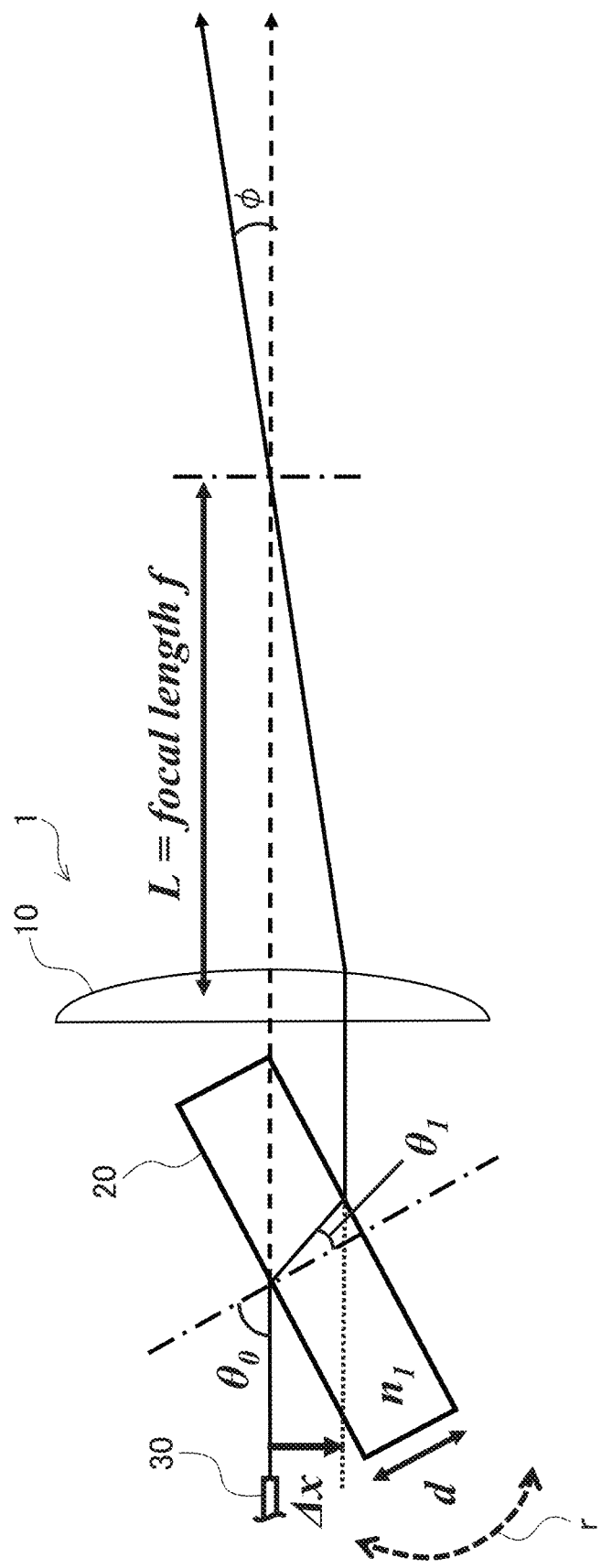
FIG. 2 is a diagram describing the principles of the optical apparatus shown in FIG. 1 in more detail.

FIG. 2 is a diagram for describing the principles of the optical apparatus 1 configured as described above in more detail.

In FIG. 2, a light propagation direction angle φ for an inclination angle $\theta_0$ of the parallel flat plate 20 is represented by the mathematical formula 1 below in which f represents the focal length of the convex lens 10 that is a condensing optical part and $n_1$ represents a refractive index of the parallel flat plate 20. Note that in FIG. 2, d indicates the physical thickness of the parallel flat plate 20 and Δx indicates the amount of parallel shift (the amount of shift of the apparent focal position) of the light beam in the direction perpendicular to the optical axis.

$$\phi = \tan^{-1}\left(\frac{\Delta x}{f}\right) \cong \frac{\Delta x}{f} = \frac{d}{f\cos\theta_1} \times \sin(\theta_0 - \theta_1) = \frac{d}{f}\sin\theta_0\left(1 - \frac{\cos\theta_0}{\sqrt{n_1^2 - \sin^2\theta_0}}\right) \quad \text{(Math. 1)}$$

Figure 3:
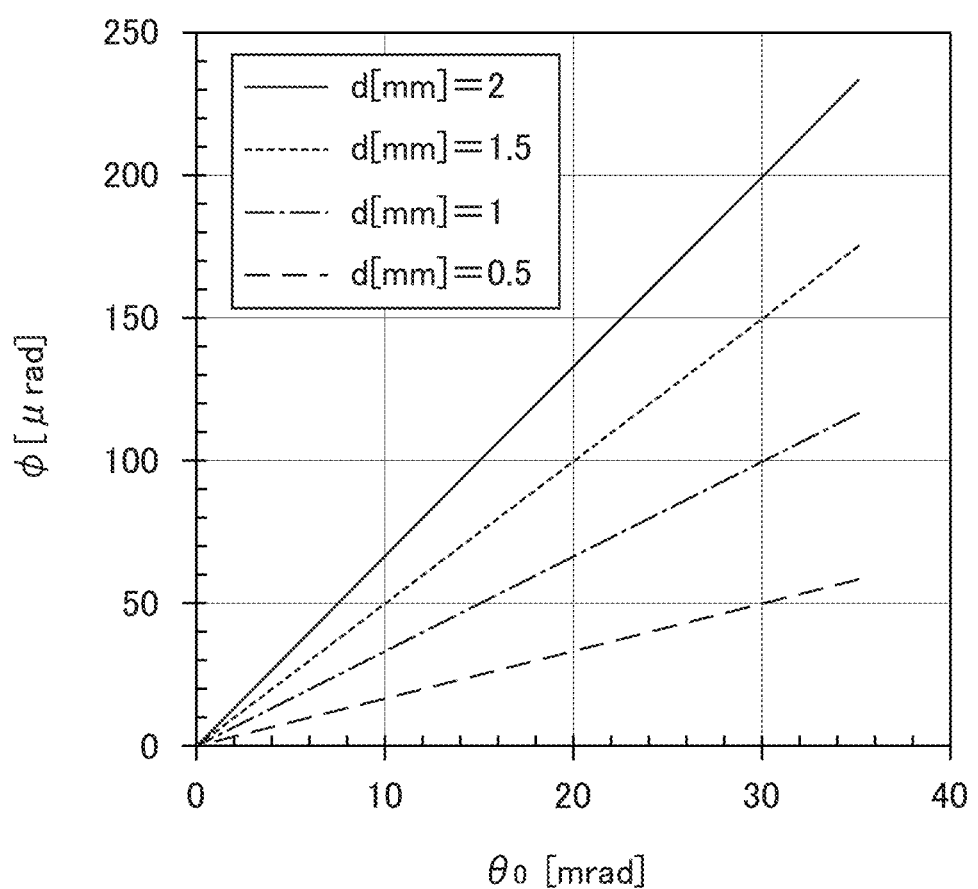
FIG. 3 is a graph showing an example of a calculation result of the light propagation direction angle in the optical apparatus shown in FIG. 1.

When calculation is performed with f as 100 mm and $n_1$ as 1.5 in this mathematical formula 1, the result is as shown in FIG. 3. The graph of FIG. 3 relates to four optical parallel flat plates 20 having different physical thicknesses d, and shows the light propagation direction angle φ with respect to the inclination angle $\theta_0$, which is a calculation result showing the dependency of the direction control performance on the thickness d. As is obvious from the graph, since the amount of change in φ with respect to $\theta_0$ is reduced by approximately three orders of magnitude, the control accuracy of the light-propagation direction is improved by approximately three orders of magnitude. For example, in the case where laser power is supplied to a lunar exploration rover equipped with a light-receiving panel having an opening of an approximately 300 mm diameter, at least 50 μrad (50 mm deviation for 1 km ahead) or less of the direction control accuracy is necessary. However, when d=1.5 mm, $\theta_0$ is sufficient with approximately 10 mrad of pivot accuracy.

In the optical apparatus 1 according to an embodiment of the present disclosure, not only the above-mentioned one-dimensional direction control but also two-dimensional direction control may be performed. The two-dimensional direction control can be realized by, for example, inserting two optical parallel flat plates 20 between the laser light source 30 and the convex lens 10, and causing them to pivot in the axis (x-axis) perpendicular to the optical axis (z-axis) and perpendicular to the paper surface, and in the axis (y-axis) parallel to the paper surface, or causing one optical parallel flat plate to pivot in two axes of the x-axis and the y-axis. Further, the two-dimensional direction control is possible also by a combination of pivoting with respect to an arbitrary axis (r-axis) perpendicular to the optical axis (z-axis) and rotation about the optical axis (z-axis) itself.

Figure 16:
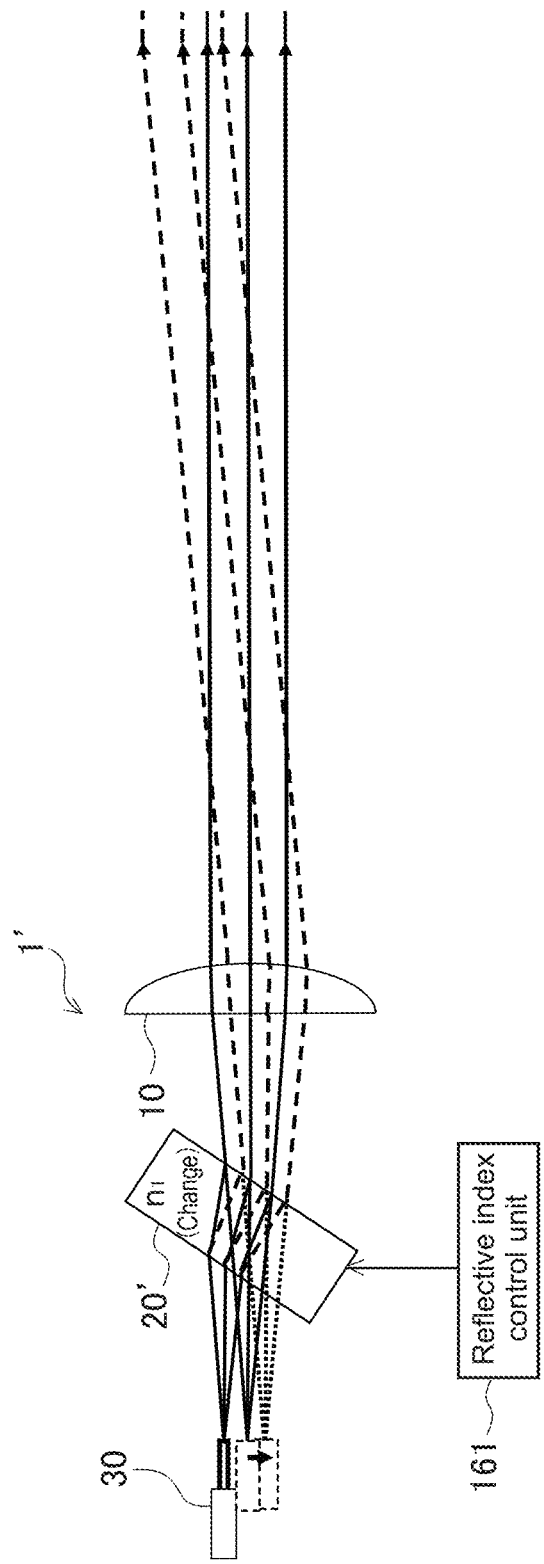
FIG. 16 is a diagram showing a configuration of an optical apparatus according to a modified example of the first embodiment of the present disclosure.

Further, as can be seen in the mathematical formula 1, in the case of an optical apparatus 1' using an optical parallel flat plate 20' in which a refractive index $n_1$ can be changed by controlling the application of electromagnetic field, heat, light, or the like under the control of a refractive index control unit 161 instead of the above-mentioned optical apparatus 1 as shown in FIG. 16, the light propagation direction angle φ can be controlled while the parallel flat plate 20' is fixed at a predetermined inclination angle without being caused to pivoting. In this case, there is no mechanical drive unit, and resistance to mechanical vibration and wear is also improved. Examples of those having a variable refractive index include optical crystals using electro-optical effects in LN (lithium niobate) crystals, KDP (potassium dihydrogen phosphate) crystals, BBO (beta barium borate) crystals, and KTN (potassium tantalate niobate) crystals. By using these as the parallel flat plate 20', it is considered that the direction control can be performed at high speed at least on the order of kHz or more. Note that the material of the parallel flat plate 20' is not limited thereto and may be any material having a variable refractive index. Further, by using two parallel flat plates 20' having a variable refractive index and controlling the light propagation direction angle φ on axes perpendicular to each other (e.g., vertical and horizontal), two-dimensional direction control is also possible.

Note that an optical apparatus in which the laser light source 30 in FIG. 1 and FIG. 2 is replaced with a light sensor and the traveling direction of the light is reversed is also conceivable. In this case, a light receiving device capable of selecting the angle of arrival of light with high accuracy is achieved.

Second Embodiment

Figure 4:
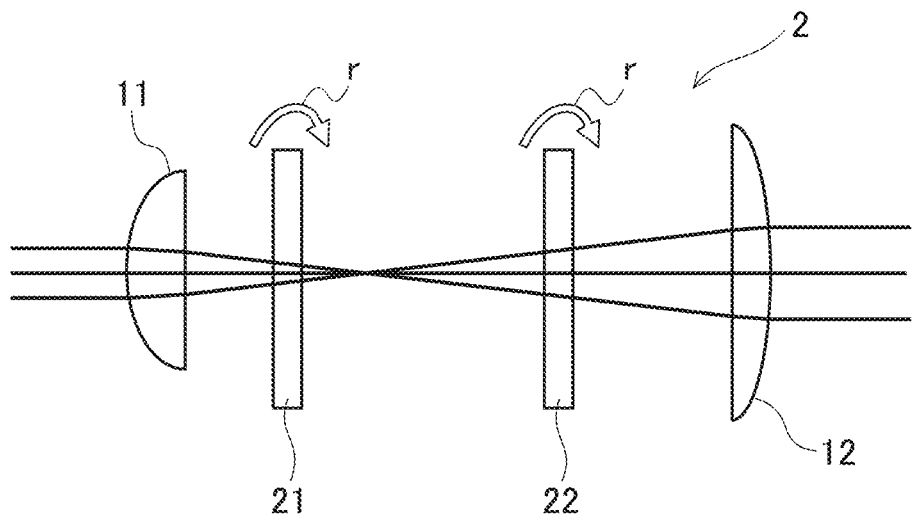
FIG. 4 is a diagram showing a configuration of an optical apparatus according to a second embodiment of the present disclosure.

FIG. 4 is a diagram showing a configuration of an optical apparatus according to a second embodiment of the present disclosure.

As shown in FIG. 4, an optical apparatus 2 is an optical relay system or a Keplerian beam-diameter converter, and includes a first convex lens 11, a first transmissive optical parallel flat plate 21, a second transmissive optical parallel flat plate 22, and a second convex lens 12.

The first convex lens 11 focuses a laser beam, which is a collimated beam, in the optical apparatus 2. The second convex lens 12 makes a laser beam that is a divergent beam in the optical apparatus 2 a collimated beam. This allows the optical apparatus 2 to function as an optical relay system or a beam-diameter converter.

The first parallel flat plate 21 is inserted between the first convex lens 11 and the focal point of the first and second convex lenses 11 and 12. The second parallel flat plate 22 is inserted between the focal point of the first and second convex lenses 11 and 12 and the second convex lens 12. The first and second parallel flat plates 21 and 22 are held so as to be pivotable in the direction indicated by the reference symbol r in the drawings.

In the optical apparatus 2 configured as described above, it is possible to control the propagation direction of the laser beam that has passed through the convex lens 12 by controlling the pivoting of the first and second parallel flat plates 21 and 22 in the r-direction while exerting the function of the optical relay system or the beam-diameter converter.

Note that in this optical apparatus 2, the first and second parallel flat plates 21 and 22 are inserted on both sides of the focal point, but one parallel flat plate may be inserted on only one of the sides.

Further, in the case where the parallel flat plates 21 and 22 whose refractive index can be changed by application of electromagnetic field, heat, or light are used, it is possible to control the light propagation direction angle φ while fixing the parallel flat plates 21 and 22 at a predetermined inclination angle without pivoting. In this case, there is no mechanical drive unit, and resistance to mechanical vibration and wear is also improved.

Note that an optical apparatus in which the traveling direction of the light in FIG. 4 is reversed is also conceivable. In this case, a light receiving device capable of selecting the angle of arrival of light with high accuracy is achieved.

Third Embodiment

Figure 5:
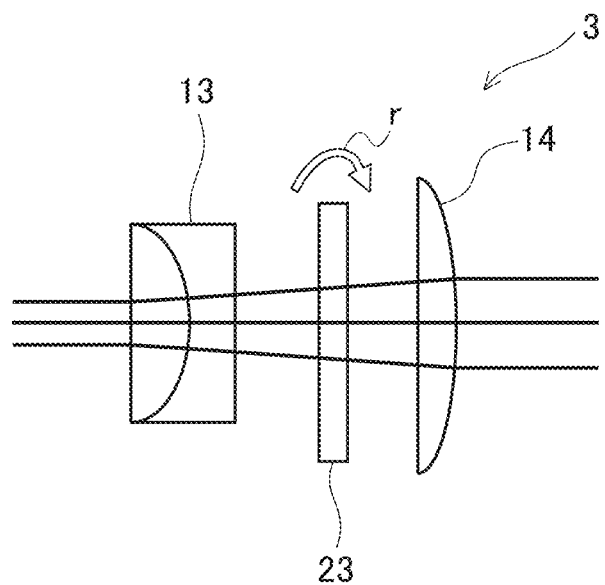
FIG. 5 is a diagram showing a configuration of an optical apparatus according to a third embodiment of the present disclosure.

FIG. 5 is a diagram showing a configuration of an optical apparatus according to a third embodiment of the present disclosure.

As shown in FIG. 5, an optical apparatus 3 is a Galilean beam-diameter converter, and includes one concave lens 13, one convex lens 14, and a transmissive optical parallel flat plate 23.

The concave lens 13 diverges a laser beam, which is a collimated beam, in the optical apparatus 3. The convex lens 14 makes the laser beam that is the divergent beam in the optical apparatus 3 a collimated beam. As a result, the optical apparatus 3 exerts the function of the beam-diameter converter.

The parallel flat plate 23 is inserted between the convex lens 14 and the focal point (located on the outside of the optical apparatus 3) of the convex lens 14 and between the concave lens 13 and the convex lens 14. The parallel flat plate 23 is held so as to be pivotable in the direction indicated by the reference symbol r in the drawings.

In the optical apparatus 3 configured as described above, it is possible to control the propagation direction of the laser beam that has passed through the convex lens 14 by controlling the pivoting of the parallel flat plate 23 in the r-direction while exerting the function of the beam-diameter converter. Note that since the focal point of the concave lens 13 and the convex lens 14 is on the outside of the optical apparatus 3 as compared with the second embodiment shown in FIG. 4, it is possible to reduce the optical apparatus 3 in size.

Further, in the case where the parallel flat plate 23 whose refractive index can be changed by application of electromagnetic field, heat, or light is used, it is possible to control the light propagation direction angle φ while fixing the parallel flat plate 23 at a predetermined inclination angle without pivoting. In this case, there is no mechanical drive unit, and resistance to mechanical vibration and wear is also improved.

Note that an optical apparatus in which the traveling direction of the light in FIG. 5 is reversed is also conceivable. In this case, a light receiving device capable of selecting the angle of arrival of light with high accuracy is achieved.

Fourth Embodiment

Figure 6:
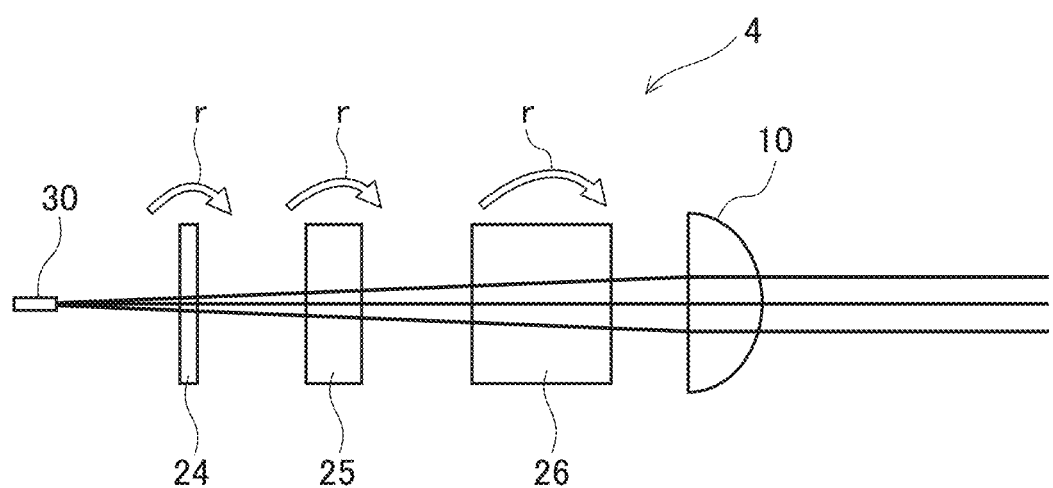
FIG. 6 is a diagram showing a configuration of an optical apparatus according to a fourth embodiment of the present disclosure.

FIG. 6 is a diagram showing a configuration of an optical apparatus according to a fourth embodiment of the present disclosure.

As shown in FIG. 6, an optical apparatus 4 includes three transmissive optical parallel flat plates 24, 25, and 26 having different thicknesses while the optical apparatus 1 shown in FIG. 1 includes one parallel flat plate 20.

The parallel flat plates 24, 25, and 26 are inserted between the convex lens 10 and the laser light source 30. The parallel flat plates 24, 25, and 26 are independently pivotably held in the direction indicated by the reference symbol r in the drawings.

In the optical apparatus 4 configured as described above, it is possible to change the propagation direction of the laser beam with different accuracy and different pitch by controlling the pivoting of the parallel flat plates 24, 25, and 26 independently in the r-direction while exerting the function of the collimator. Note that the number of optical parallel flat plates is not limited to three, and may be any number. The degree of flexibility of accuracy and pitch increases in accordance with the number.

Figure 7:
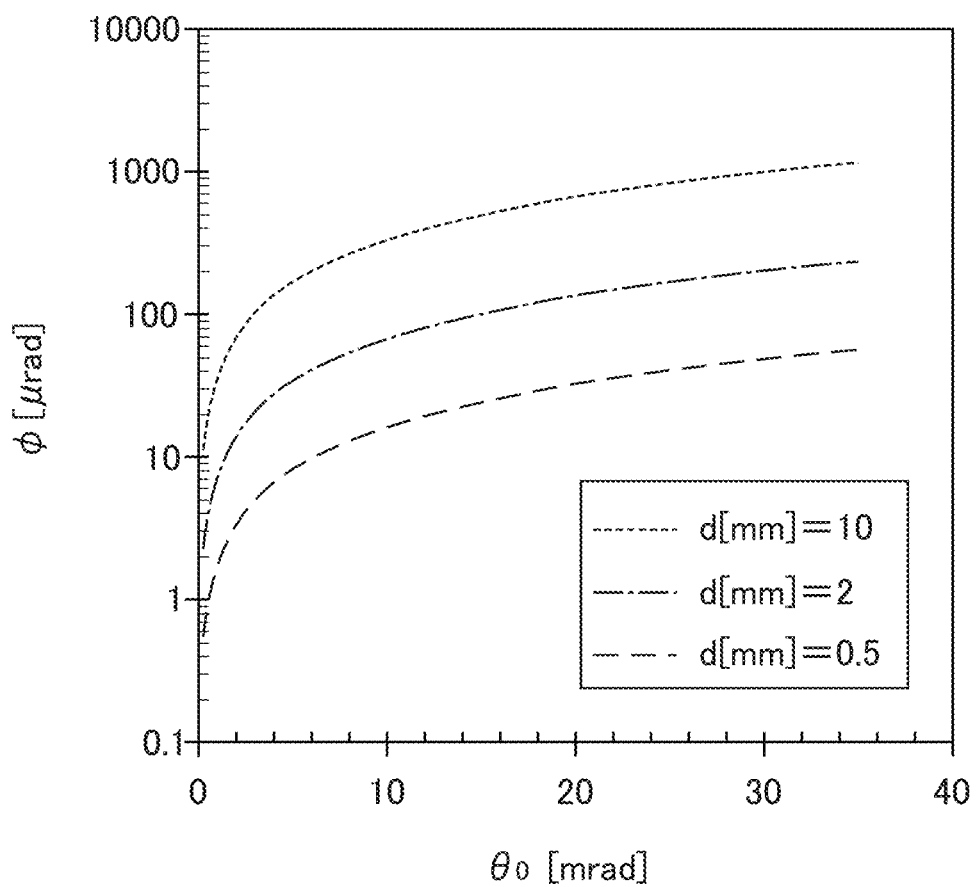
FIG. 7 shows a calculation result of the light propagating direction angle when optical parallel flat plates having different thicknesses in the optical apparatus shown in FIG. 6 are caused to pivot independently.

The graph in FIG. 7 shows an example of a calculation result showing the light propagation direction angle φ that has passed through the convex lens 10 with respect to the inclination angle $\theta_0$ of the parallel flat plates 24, 25, and 26 in the case where thicknesses d of the parallel flat plates 24, 25, and 26 are separated by a large distance. Here, the focal length of the convex lens 10 is 100 mm, and the refractive indices are all 1.5. As can be seen from this graph, in the case where three optical parallel flat plates having greatly different thicknesses are inserted, the direction control accuracy and pitch according to the respective parallel flat plates may be values having differences of several times to 10 times or more. Since the total control angle in this embodiment is the sum of the control angles of the parallel flat plates 24, 25, and 26, it is possible to collectively load functions that are difficult in existing devices, e.g., it is possible to simultaneously perform both coarse adjustment and fine adjustment by inserting a plurality of optical parallel flat plates having greatly different thicknesses. Note that the same refractive indices are set for all the three parallel flat plates in the calculation in FIG. 7, but the control accuracy and pitch according to the respective parallel flat plates can be similarly changed also by changing the values of the respective refractive indices.

In the optical apparatus 4 according to this embodiment, it is possible to not only change the propagation direction of the laser beam with different accuracy and pitch as described above, but also reduce the astigmatism that increases in proportion to the square of the angle $\theta_0$ by increasing the number of optical parallel flat plates to two or more to reduce the maximum values of the respective inclination angles $\theta_0$.

Further, in the case where the parallel flat plates 24, 25, and 26 whose refractive indices can be changed by application of electromagnetic field, heat, light, or the like are used, it is possible to control the light propagation direction angle φ while fixing the parallel flat plates 24, 25, and 26 at a predetermined inclination angle without pivoting. In this case, there is no mechanical drive unit, and resistance to mechanical vibration and wear is also improved.

Note that an optical apparatus in which the laser light source 30 in FIG. 6 is replaced with a light sensor and the traveling direction of the light is reversed is also conceivable. In this case, a light receiving device capable of selecting the angle of arrival of light with high accuracy is achieved.

Fifth Embodiment

Figure 8:
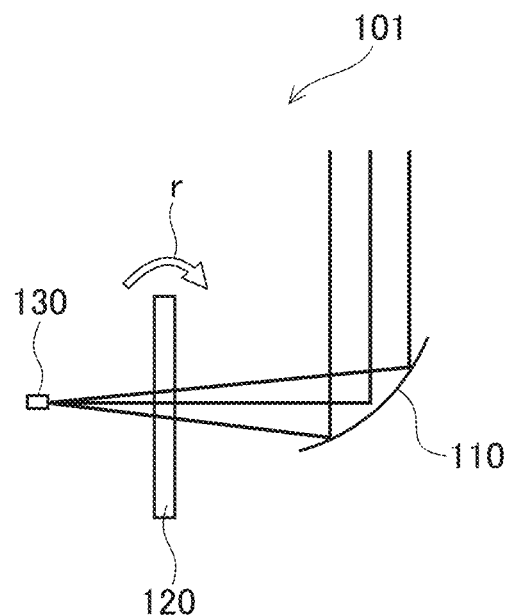
FIG. 8 is a diagram showing a configuration of an optical apparatus according to a fifth embodiment of the present disclosure.

FIG. 8 is a diagram showing a configuration of an optical apparatus according to a fifth embodiment of the present disclosure.

As shown in FIG. 8, an optical apparatus 101 is a collimator that converts a divergent beam into a collimated beam, and includes a concave mirror 110 and a transmissive optical parallel flat plate 120 inserted between a laser light source 130 and the concave mirror 110.

The concave mirror 110 makes a laser beam that is a divergent beam output from the laser light source 130 disposed at the position of the focal point of the concave mirror 110 a collimated beam.

The parallel flat plate 120 is pivotably held. For example, the parallel flat plate 120 is caused to pivot in the direction indicated by the reference symbol r in the drawings.

The parallel flat plate 120 is held by a holding mechanism (optical element holder) (not shown) and is caused to pivot manually, for example. Alternatively, the parallel flat plate 120 is pivotably held by a rotation drive mechanism (kinematic mount for an optical element or a rotation stage) (not shown). For example, the parallel flat plate 120 may be pivotably driven under the control of a predetermined control system (a system including a stepping motor or a piezo-electric drive device) (not shown).

Such an optical apparatus 101 constitutes a light-propagation-direction controller, a selector, or the like including a Fourier transform optical system having a conversion function between a light spatial distribution and a light propagation angular distribution.

For example, in this optical apparatus 101, when the parallel flat plate 120 is caused to pivot in the direction indicated by the reference symbol r in the drawings, the apparent focal point of the concave mirror 110 as viewed from the concave mirror 110 (the output end image of the laser light source 130) shifts in the direction perpendicular to the optical axis connecting the laser light source 130 and the concave mirror 110 to each other. As a result, the propagation direction of the light in the direction crossing the optical axis connecting the laser light source 130 and the concave mirror 110 to each other is controlled via the concave mirror 110. In other words, in the optical apparatus 101 according to an embodiment of the present disclosure, it is possible to control the propagation direction of the laser beam that has been output from the optical apparatus 101 and passed through the concave mirror 110 by changing the angle of the parallel flat plate 120 with respect to the optical axis. Note that in this embodiment, since not a transmissive refractive-type lens that generally has a refractive-index dispersion but a reflective mirror is used, the difficulty of optical alignment is likely to increase generally at the same time when the optical axis bends greatly, but there is a possibility that it can be applied in a wider wavelength range. Further, heat generation due to light absorption hardly occurs because of the reflection type, and cooling is easy even if heat generation occurs.

Further, in the case where the parallel flat plate 120 whose refractive index can be changed by application of electromagnetic field, heat, or light is used, the light propagation direction angle φ can be controlled while fixing the parallel flat plate 120 at a fixed angle without pivoting. In this case, there is no mechanical drive unit, and resistance to mechanical vibration and wear is also improved.

Note that an optical apparatus in which the laser light source 130 in FIG. 8 is replaced with a light sensor and the traveling direction of the light is reversed is also conceivable. In this case, a light receiving device capable of selecting the angle of arrival of light with high accuracy is achieved.

Sixth Embodiment

Figure 9:
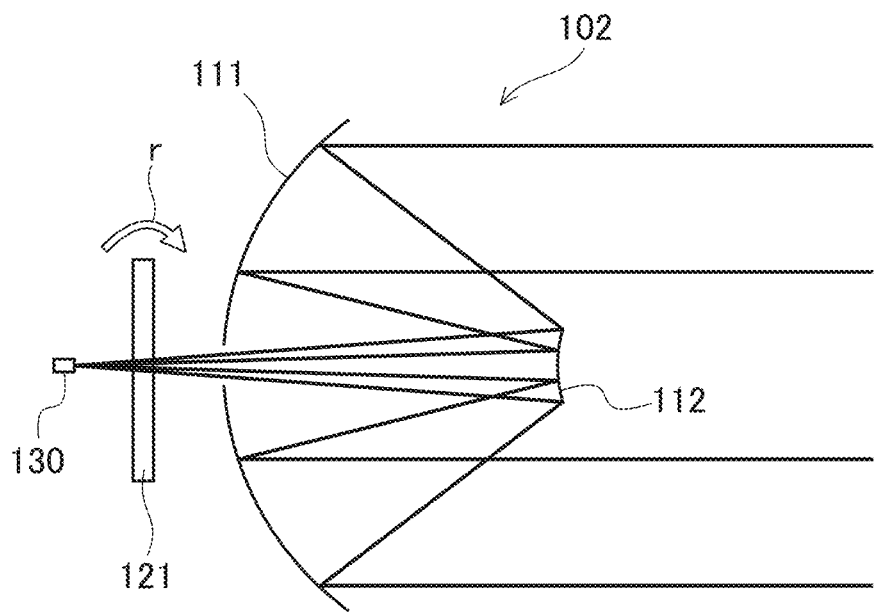
FIG. 9 is a diagram showing a configuration of an optical apparatus according to a sixth embodiment of the present disclosure.

FIG. 9 is a diagram showing a configuration of an optical apparatus according to a sixth embodiment of the present disclosure.

As shown in FIG. 9, an optical apparatus 102 is a collimator using a large-diameter Cassegrain-type reflecting telescope that converts a divergent beam into a collimated beam, and includes a pair of a concave mirror 111 and a convex mirror 112, and a transmissive optical parallel flat plate 121 inserted between the laser light source 130 and the concave mirror 111 and between the laser light source 130 and the convex mirror 112.

The pair of the concave mirror 111 and the convex mirror 112 make a laser beam that is a divergent beam output from the laser light source 130 disposed at the position of the focal point of the pair of the concave mirror 111 and the convex mirror 112 a collimated beam. By using a Cassegrain-type reflecting telescope as in this embodiment, it is possible to accommodate large-diameter beams of approximately 50 mm diameter or more, which are generally difficult to accommodate using a transmission-refractive-type lens.

The parallel flat plate 121 is pivotably held. For example, the parallel flat plate 121 is caused to pivot in the direction indicated by the reference symbol r in the drawings.

The parallel flat plate 121 is held by a holding mechanism (optical element holder) (not shown) and is caused to pivot manually, for example. Alternatively, the parallel flat plate 121 is pivotably held by a rotation drive mechanism (kinematic mount for an optical element or a rotation stage) (not shown). For example, the parallel flat plate 120 may be pivotably driven under the control of a predetermined control system (a system including a stepping motor or a piezo-electric drive device) (not shown).

Such an optical apparatus 102 constitutes a light-propagation-direction controller, a selector, or the like including a Fourier transform optical system having a conversion function between a light spatial distribution and a light propagation angular distribution.

For example, in this optical apparatus 102, when the parallel flat plate 121 is caused to pivot in the direction indicated by the reference symbol r in the drawings, the apparent focal point as viewed from the pair of the concave mirror 111 and the convex mirror 112 (the output end image of the laser light source 130) shifts in the direction perpendicular to the optical axis connecting the laser light source 130 and the pair of the concave mirror 111 and the convex mirror 112 to each other. As a result, the propagation direction of the light on the side opposite to the focal point (the output end image of the laser light source 130) with the pair of the concave mirror 111 and the convex mirror 112 interposed therebetween is controlled. In other words, in the optical apparatus 102 according to an embodiment of the present disclosure, it is possible to control the propagation direction of the light on the opposite side with the pair of the concave mirror 111 and the convex mirror 112 interposed therebetween by changing the angle of the parallel flat plate 121 with respect to the optical axis. Note that in FIG. 9, the Cassegrain-type reflecting telescope is exemplified as an optical mechanism (condensing optical part) that is capable of accommodating large-diameter beams of approximately 50 mm or more, which are generally difficult to accommodate using a transmission-refractive-type lens. However, the present disclosure is not limited thereto, and other types of reflecting telescopes may be used.

Further, when the parallel flat plate 121 whose refractive index can be changed by application of electromagnetic field, heat, or light is used, it is possible to control the light propagation direction angle φ while fixing the parallel flat plate 121 at a predetermined inclination angle without pivoting. In this case, there is no mechanical drive unit, and resistance to mechanical vibration and wear is also improved.

Note that an optical apparatus in which the laser light source 130 in FIG. 9 is replaced with a light sensor and the traveling direction of the light is reversed is also conceivable. In this case, a light receiving device capable of selecting the angle of arrival of light with high accuracy is achieved.

Seventh Embodiment

Figure 10:
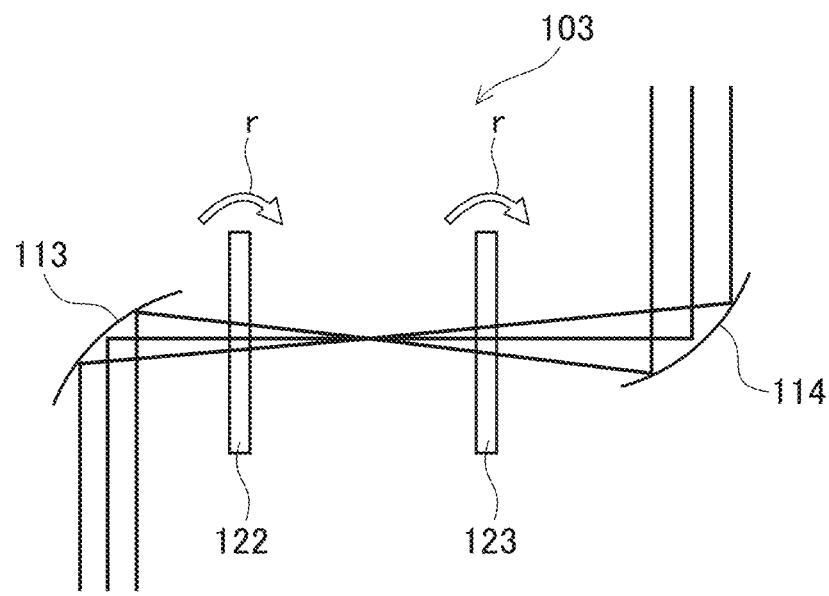
FIG. 10 is a diagram showing a configuration of an optical apparatus according to a seventh embodiment of the present disclosure.

FIG. 10 is a diagram showing a configuration of an optical apparatus according to a seventh embodiment of the present disclosure.

As shown in FIG. 10, an optical apparatus 103 is a Keplerian reflective optical relay system or beam-diameter converter, and includes a first concave mirror 113, a first transmissive optical parallel flat plate 122, a second transmissive optical parallel flat plate 123, and a second concave mirror 114.

The first concave mirror 113 focuses a laser beam, which is a collimated beam, in the optical apparatus 103. The second concave mirror 114 makes a laser beam that is a divergent beam in the optical apparatus 103 a collimated beam. This allows the optical apparatus 103 to function as an optical relay system or a beam-diameter converter.

The first parallel flat plate 122 is inserted between the first concave mirror 113 and the focal point of the first and second concave mirrors 113 and 114. The second parallel flat plate 123 is inserted between the focal point of the first and second concave mirrors 113 and 114 and the second concave mirror 114. The first and second parallel flat plates 122 and 123 are held so as to be pivotable in the r-direction in the drawings.

In the optical apparatus 103 configured as described above, it is possible to control the propagation direction of the light that has passed through the concave mirror 114 by controlling the pivoting of the first and second parallel flat plates 122 and 123 in the r-direction while exerting the function of the optical relay system or the beam-diameter converter. Note that in this embodiment, since not a transmissive refractive-type lens that generally has a refractive-index dispersion but a reflective mirror is used, the difficulty of optical alignment is likely to increase generally at the same time when the optical axis bends greatly, but there is a possibility that it can be applied in a wider wavelength range. Further, heat generation due to light absorption hardly occurs because of the reflection type, and cooling is easy even if heat generation occurs.

Note that in this optical apparatus 103, the first and second parallel flat plates 122 and 123 are inserted on both sides of the focal point, but one parallel flat plate may be inserted on only one side of the focal point.

Further, in the case where the parallel flat plates 122 and 123 whose refractive index can be changed by application of electromagnetic field, heat, or light are used, it is possible to control the light propagation direction angle φ while fixing the parallel flat plates 122 and 123 at a predetermined inclination angle without pivoting. In this case, there is no mechanical drive unit, and resistance to mechanical vibration and wear is also improved.

Note that an optical apparatus in which the traveling direction of the light in FIG. 10 is reversed is also conceivable. In this case, a light receiving device capable of selecting the angle of arrival of light with high accuracy is achieved.

Eighth Embodiment

Figure 11:
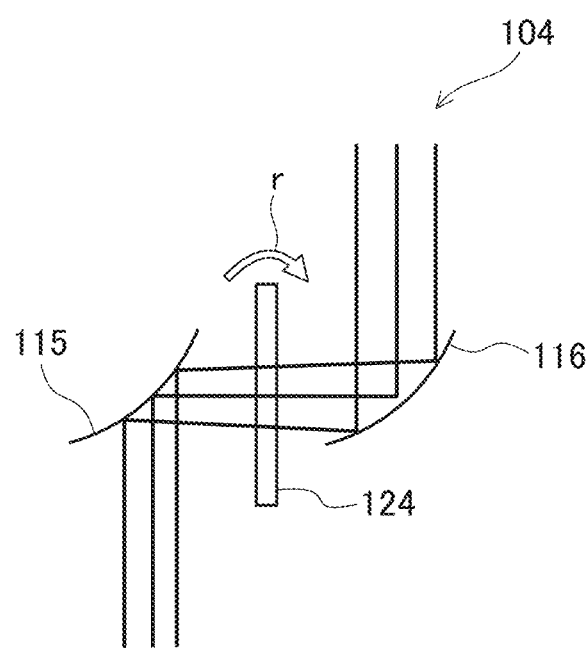
FIG. 11 is a diagram showing a configuration of an optical apparatus according to an eighth embodiment of the present disclosure.

FIG. 11 is a diagram showing an optical apparatus according to an eighth embodiment of the present disclosure.

As shown in FIG. 11, an optical apparatus 104 is a Galilean reflective beam-diameter converter, and includes one convex mirror 115, one concave mirror 116, and a transmissive optical parallel flat plate 124.

The convex mirror 115 diverges a laser beam, which is a collimated beam, in the optical apparatus 104. The concave mirror 116 makes the laser beam that is the divergent beam in the optical apparatus 104 a collimated beam. As a result, the optical apparatus 104 exerts the function of the beam-diameter converter.

The parallel flat plate 124 is inserted between the concave mirror 116 and the focal point (located on the outside of the optical apparatus 104) of the concave mirror 116 and between the concave mirror 116 and the convex mirror 115. The parallel flat plate 124 is held so as to be pivotable in the direction indicated by the reference symbol r in the drawings.

In the optical apparatus 104 configured as described above, it is possible to control the propagation direction of the light that has passed through the concave mirror 116 by controlling the pivoting of the parallel flat plate 124 in the r-direction while exerting the function of the beam-diameter converter. Note that in this embodiment, since not a transmissive refractive-type lens that generally has a refractive-index dispersion but a reflective mirror is used, the difficulty of optical alignment is likely to increase generally at the same time when the optical axis bends greatly, but there is a possibility that it can be applied in a wider wavelength range. Further, heat generation due to light absorption hardly occurs because of the reflection type, and cooling is easy even if heat generation occurs. In addition, since the focal point of the convex mirror 115 and the concave mirror 116 is on the outside of the optical apparatus 104 as compared with the seventh embodiment, it is possible to generally reduce the optical apparatus 104 in size.

Further, in the case where the parallel flat plate 124 whose refractive index can be changed by application of electromagnetic field, heat, or light is used, it is possible to control the light propagation direction angle φ while fixing the parallel flat plate 124 at a predetermined inclination angle without pivoting. In this case, there is no mechanical drive unit, and resistance to mechanical vibration and wear is also improved.

Note that an optical apparatus in which the traveling direction of the light in FIG. 11 is reversed is also conceivable. In this case, a light receiving device capable of selecting the angle of arrival of light with high accuracy is achieved.

Ninth Embodiment

Figure 12:
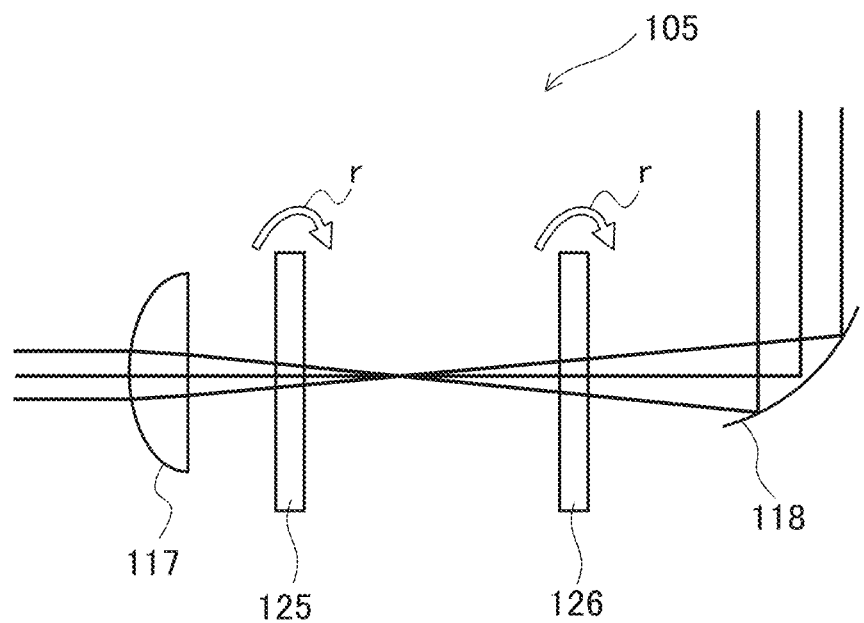
FIG. 12 is a diagram showing a configuration of an optical apparatus according to a ninth embodiment of the present disclosure.

FIG. 12 is a diagram showing a configuration of an optical apparatus according to a ninth embodiment of the present disclosure.

As shown in FIG. 12, an optical apparatus 105 is a Keplerian transmission/reflection mixed optical relay system or beam-diameter converter, and includes a convex lens 117, a first transmissive optical parallel flat plate 125, a second transmissive optical parallel flat plate 126, and a concave mirror 118.

The convex lens 117 focuses a laser beam, which is a collimated beam, in the optical apparatus 105. The concave mirror 118 makes a laser beam that is a divergent beam in the optical apparatus 105 a collimated beam. This allows the optical apparatus 105 to function as an optical relay system or a beam-diameter converter.

The first parallel flat plate 125 is inserted between the convex lens 117 and the focal point of the convex lens 117 and the concave mirror 118. The second parallel flat plate 126 is inserted between the focal point of the convex lens 117 and the concave mirror 118 and the concave mirror 118. The first and second parallel flat plates 125 and 126 are held so as to be pivotable in the r-direction in the drawings.

In the optical apparatus 105 configured as described above, it is possible to control the propagation direction of the light that has passed through the concave mirror 118 by controlling the pivoting of the first and second parallel flat plates 125 and 126 in the r-direction while exerting the function of the optical relay system or the beam-diameter converter. As in this embodiment, a transmissive refractive-type lens and a reflecting mirror, which have advantages and disadvantages as elements for condensing or diverging, can be used selectively and in combination in accordance with the requirements and limitations (e.g., layout of the inside of a casing of a laser transmitter, laser wavelengths and bands, or thermal control capabilities) of a system to which an embodiment of the present disclosure is applied. It goes without saying that the convex lens 117 may be substituted for a concave mirror and the concave mirror 118 may be substituted for a convex lens.

Note that in this optical apparatus 105, the first and second parallel flat plates 125 and 126 are inserted on both sides of the focal point, but one parallel flat plate may be inserted on only one side of the focal point.

Further, in the case where the parallel flat plates 125 and 126 whose refractive index can be changed by application of electromagnetic field, heat, or light are used, it is possible to control the light propagation direction angle φ while fixing the parallel flat plates 125 and 126 at a predetermined inclination angle without pivoting. In this case, there is no mechanical drive unit, and resistance to mechanical vibration and wear is also improved.

Note that an optical apparatus in which the traveling direction of the light in FIG. 12 is reversed is also conceivable. In this case, a light receiving device capable of selecting the angle of arrival of light with high accuracy is achieved.

Tenth Embodiment

Figure 13:
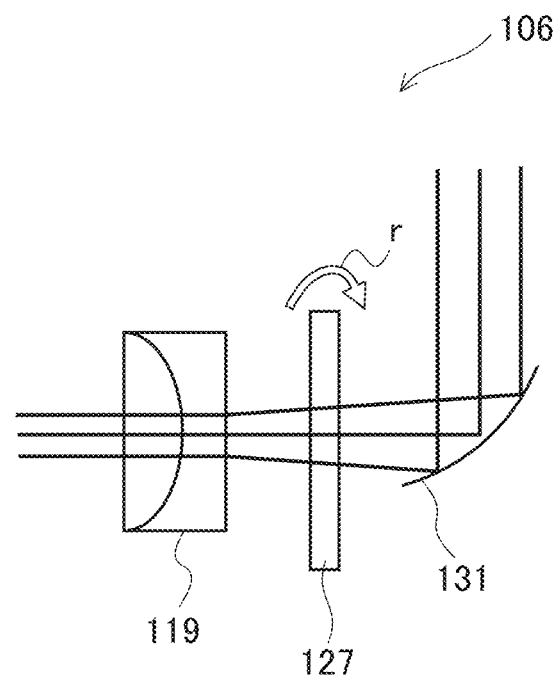
FIG. 13 is a diagram showing a configuration of an optical apparatus according to a tenth embodiment of the present disclosure.

FIG. 13 is a diagram showing a configuration of an optical apparatus according to a tenth embodiment of the present disclosure.

As shown in FIG. 13, an optical apparatus 106 is a Galilean transmission/reflection mixed beam-diameter converter, and includes one concave lens 119, one concave mirror 131, and a transmissive optical parallel flat plate 127.

The concave lens 119 diverges a laser beam, which is a collimated beam, in the optical apparatus 106. The concave mirror 131 makes the laser beam that is the divergent beam in the optical apparatus 106 a collimated beam. As a result, the optical apparatus 106 exerts the function of the beam-diameter converter.

The parallel flat plate 127 is inserted between the concave mirror 131 and the focal point (located on the outside of the optical apparatus 106) of the concave mirror 131 and between the concave mirror 131 and the concave lens 119. The parallel flat plate 127 is held so as to be pivotable in the direction indicated by the reference symbol r in the drawings.

In the optical apparatus 106 configured as described above, it is possible to control the propagation direction of the light that has passed through the concave mirror 131 by controlling the pivoting of the parallel flat plate 127 in the r-direction while exerting the function of the beam-diameter converter. As in this embodiment, a transmissive refractive-type lens and a reflecting mirror, which have advantages and disadvantages as elements for condensing or diverging, can be used selectively and in combination in accordance with the requirements and limitations (e.g., layout of the inside of a casing of a laser transmitter, laser wavelengths and bands, or thermal control capabilities) of a system to which an embodiment of the present disclosure is applied. It goes without saying that the concave lens 119 may be substituted for a convex mirror and the concave mirror 131 may be substituted for a convex lens. Note that since the focal point of the concave lens 119 and the concave mirror 131 is on the outside of the optical apparatus 106 as compared with the ninth embodiment, it is possible to generally reduce the optical apparatus 106 in size.

Further, in the case where the parallel flat plate 127 whose refractive index can be changed by application of electromagnetic field, heat, or light is used, it is possible to control the light propagation direction angle φ while fixing the parallel flat plate 127 at a predetermined inclination angle without pivoting. In this case, there is no mechanical drive unit, and resistance to mechanical vibration and wear is also improved.

Note that an optical apparatus in which the traveling direction of the light in FIG. 13 is reversed is also conceivable. In this case, a light receiving device capable of selecting the angle of arrival of light with high accuracy is achieved.

Eleventh Embodiment

Figure 14:
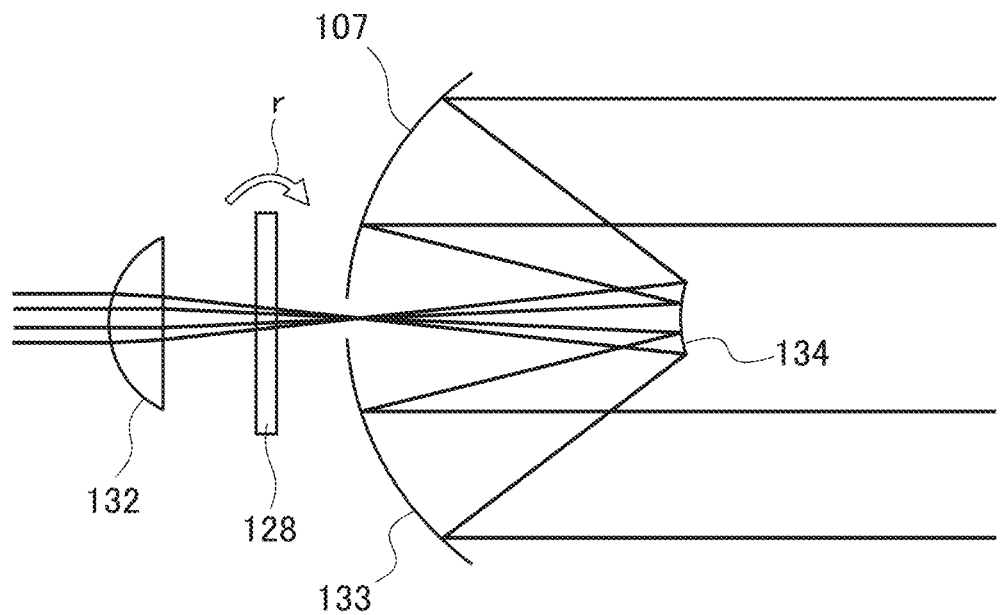
FIG. 14 is a diagram showing a configuration of an optical apparatus according to an eleventh embodiment of the present disclosure.

FIG. 14 is a diagram showing a configuration of an optical apparatus according to an eleventh embodiment of the present disclosure.

As shown in FIG. 14, the optical apparatus 107 is a Keplerian transmission/reflection mixed optical relay system or beam-diameter converter, and includes a convex lens 132, a pair of a concave mirror 133 and a convex mirror 134, which are each a Cassegrain-type reflecting telescope, and a transmissive optical parallel flat plate 128.

The convex lens 132 focuses a laser beam, which is a collimated beam, in the optical apparatus 107. The pair of the concave mirror 133 and the convex mirror 134 make a laser beam that is a divergent beam in the optical apparatus 107 a collimated beam. This allows the optical apparatus 107 to function as the optical relay system or the beam-diameter converter. By using a Cassegrain-type reflecting telescope as in this embodiment, it is possible to accommodate also large-diameter beams of approximately 50 mm or more, which are generally difficult to accommodate using a transmission-refractive-type lens.

The parallel flat plate 128 is inserted between the convex lens 132 and the focal point of the convex lens 132. The parallel flat plate 128 is held so as to be pivotable in the r-direction in the drawings.

In the optical apparatus 107 configured as described above, it is possible to control the propagation direction of the light that has passed through the concave mirror 133 by controlling the pivoting of the parallel flat plate 128 in the r-direction while exerting the function of the optical relay system or the beam-diameter converter. Note that in FIG. 14, a Cassegrain-type reflecting telescope is exemplified as an optical mechanism (condensing optical part) that is capable of accommodating large-diameter beams of approximately 50 mm or more, which are generally difficult to accommodate using a transmissive refractive-type lens. However, the present disclosure is not limited thereto, and other types of reflecting telescopes may be used.

Further, in the case where the parallel flat plate 128 whose refractive index can be changed by application of electromagnetic field, heat, or light is used, it is possible to control the light propagation direction angle φ while fixing the parallel flat plate 128 at a predetermined inclination angle without pivoting. In this case, there is no mechanical drive unit, and resistance to mechanical vibration and wear is also improved.

Note that an optical apparatus in which the traveling direction of the light in FIG. 14 is reversed is also conceivable. In this case, a light receiving device capable of selecting the angle of arrival of light with high accuracy is achieved.

Twelfth Embodiment

Figure 15:
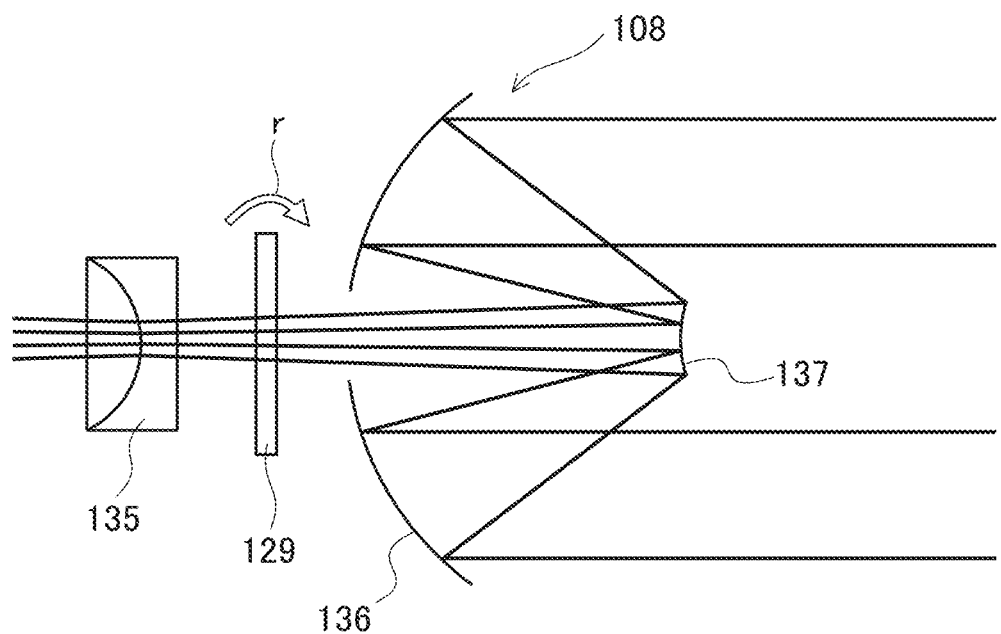
FIG. 15 is a diagram showing a configuration of an optical apparatus according to a twelfth embodiment of the present disclosure.

FIG. 15 is a diagram showing a configuration of an optical apparatus according to a twelfth embodiment of the present disclosure.

As shown in FIG. 15, an optical apparatus 108 is a Galilean transmission/reflection mixed beam-diameter converter, and includes a concave lens 135, a pair of a concave mirror 136 and a convex mirror 137, which are each a Cassegrain-type reflecting telescopes, and a transmissive optical parallel flat plate 129.

The concave lens 135 diverges a laser beam, which is a collimated beam, in the optical apparatus 108. The pair of the concave mirror 136 and the convex mirror 137 make the laser beam that is the divergent beam in the optical apparatus 108 a collimated beam. As a result, the optical apparatus 108 exerts the function of the beam-diameter converter. By using a Cassegrain-type reflecting telescope as in this embodiment, it is possible to accommodate large-diameter beams of approximately 50 mm or more, which are generally difficult to accommodate using a transmissive refractive-type lens.

The parallel flat plate 129 is inserted between a pair of the concave mirror 136 and the convex mirror 137 and the focal point (located on the outside of the optical apparatus 108) of the pair of the concave mirror 136 and the convex mirror 137 and between the convex mirror 137 and the concave lens 135. The parallel flat plate 129 is held so as to be pivotable in the direction indicated by the reference symbol r in the drawings.

In the optical apparatus 108 configured as described above, it is possible to control the propagation direction of the light that has passed through the concave mirror 136 by controlling the pivoting of the parallel flat plate 129 in the r-direction while exerting the function of the beam-diameter converter. Note that in FIG. 15, a Cassegrain-type reflecting telescope is exemplified as an optical mechanism (condensing optical part) that is capable of accommodating large-diameter beams of approximately 50 mm or more, which are generally difficult to accommodate using a transmissive refractive-type lens. However, the present disclosure is not limited thereto, and other types of reflecting telescopes may be used. In addition, since the concave lens 135 and the focal point of the pair of the concave mirror 136 and the convex mirror 137 are on the outside of the optical apparatus 108 as compared with the eleventh embodiment, it is possible to generally reduce the optical apparatus 108 in size.

Further, in the case where the parallel flat plate 129 whose refractive index can be changed by application of electromagnetic field, heat, or light is used, it is possible to control the light propagation direction angle φ while fixing the parallel flat plate 129 at a predetermined inclination angle without pivoting. In this case, there is no mechanical drive unit, and resistance to mechanical vibration and wear is also improved.

Note that an optical apparatus in which the traveling direction of the light in FIG. 15 is reversed is also conceivable. In this case, a light receiving device capable of selecting the angle of arrival of light with high accuracy is achieved.

<Example of Application to System for Laser Powering Lunar Rover>

Figure 17:
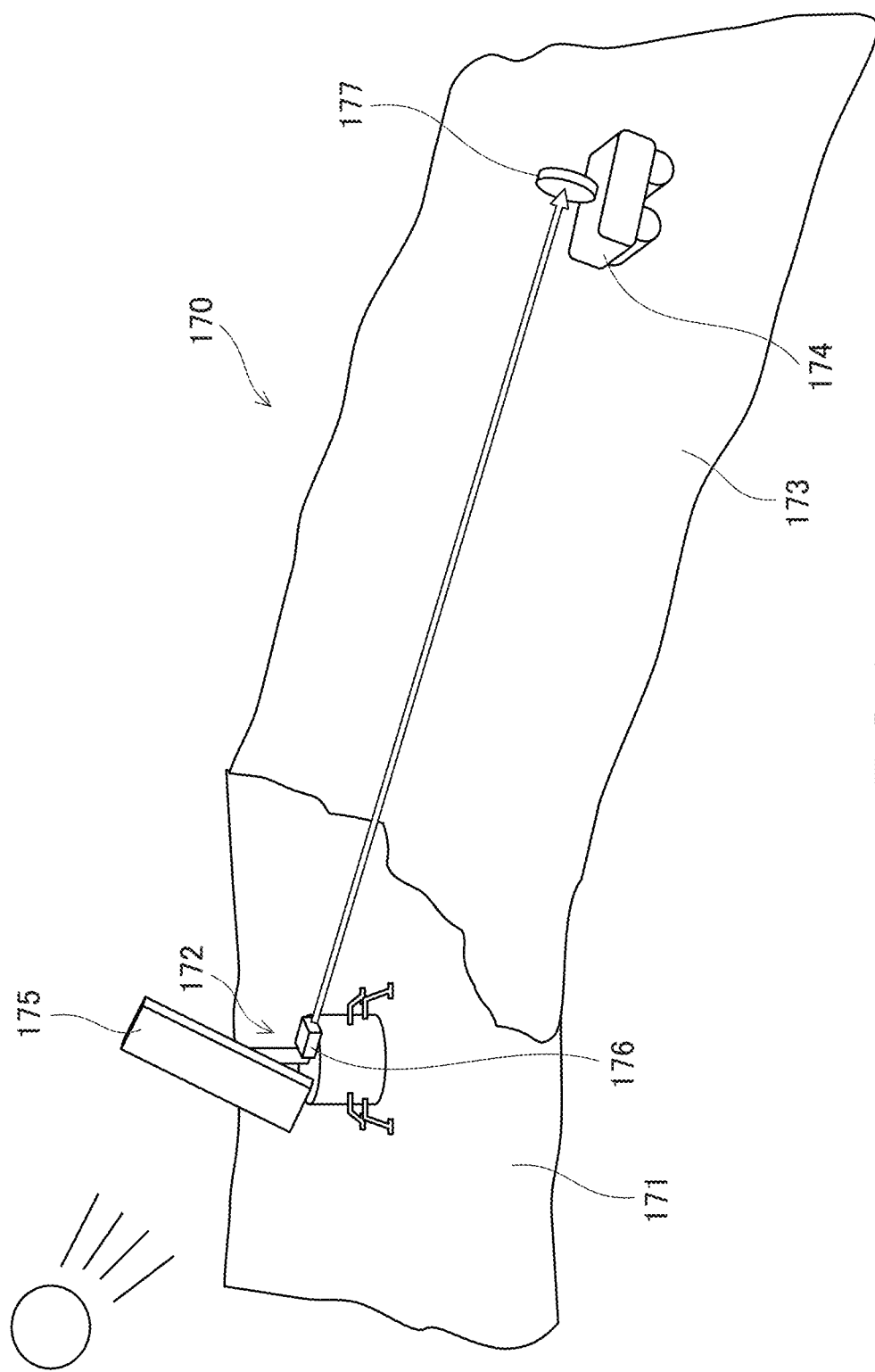
FIG. 17 is a diagram showing an Example in which an optical apparatus according to an embodiment of the present disclosure is applied to a system that laser-wirelessly powers a lunar rover.

FIG. 17 is a diagram showing an Example in which an optical apparatus according to an embodiment of the present disclosure is applied to a system for laser powering a lunar rover.

As shown in FIG. 17, a laser-wireless-power-supply system 170 includes a lunar lander 172 disposed in a lunar sunlight area 171, and a lunar rover 174 in a lunar permanent shadow area 173.

The lunar lander 172 includes a power generation system (not shown) using a photovoltaic power generation panel 175, and a laser transmitter 176 using an optical apparatus according to an embodiment of the present disclosure. The lunar rover 174 includes a photoelectric conversion panel 177 for laser reception, which receives a laser beam transmitted from the laser transmitter 176 and converts the laser beam into electricity. The light-receiving surface of the photoelectric conversion panel 177 for laser reception is assumed to be as small as, for example, 30 cm in diameter in view of weight and size limitations.

Figure 18:
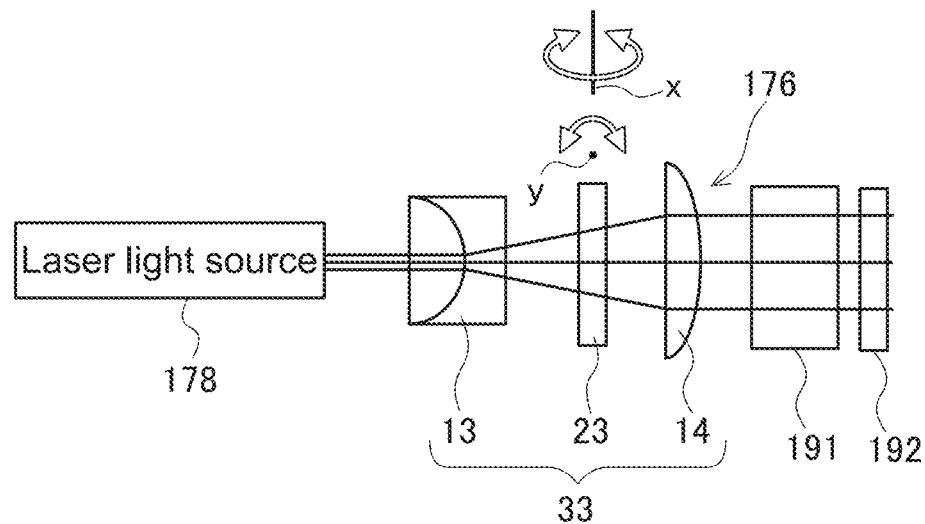
FIG. 18 is a diagram showing an internal configuration of a laser transmitter shown in FIG. 17.

FIG. 18 is a diagram showing an internal configuration of the laser transmitter 176.

As shown in FIG. 18, the laser transmitter 176 includes a laser light source 178, an optical apparatus 33 including, for example, the concave lens 13, the convex lens 14, and the transmissive optical parallel flat plate 23 shown in FIG. 5, a variable beam-diameter converter 191, and a beam shaper 192. The parallel flat plate 23 is configured to be capable of two-dimensionally adjusting the light transmission direction under the control of a control system (not shown), for example. The two-dimensional light-propagation-direction control can be realized by, for example, causing one parallel flat plate 23 in two axes of the x-axis and the y-axis. The beam shaper 192 is disposed on the subsequent stage side of the optical apparatus 33, and the laser beam emitted from the optical apparatus 33 is output to the lunar rover 174 side via the beam shaper 192. In an optical system equipped with a device that precisely controls the wavefront of a laser beam, such as a beam shaper, it is generally difficult to control the propagation direction of the wavefront-controlled light with high accuracy in the existing technology. That is, in the case where a light-propagation-direction controller is inserted in front of a beam shaper, also the entire optical system in the subsequent stage, which typically includes a beam shaper sensitive to the optical input condition, needs to be adjusted in accordance with the direction control thereof. Meanwhile, in the case of inserting the light-propagation-direction controller in the subsequent stage, a risk of collapsing the controlled wavefront, or the like may occur. In contrast, they can be easily avoided by using the configuration according to an embodiment of the present disclosure in which an optical parallel flat plate only needs to be inserted. Note that as shown in FIG. 1 and FIG. 2, the position of the beam barycenter does not change even when shaking the light propagation direction at the focal position on the right side of the lens 10. By disposing the beam shaper 192 at a position corresponding to this, it is possible to suppress the change in the optical input condition to the beam shaper 192, i.e., the deterioration of the wavefront control performance.

In the laser-wireless-power-supply system 170 configured as described above, by adjusting the parallel flat plate 23 in accordance with the signal from the sub-system (not shown) that detects the deviation of the laser-arrival position, it is possible to accurately apply the laser beam emitted from the laser transmitter 176 of the lunar lander 172 with a positional deviation of approximately several centimeters or less to the photoelectric conversion panel 177 for laser reception of the lunar rover 174 which is away by approximately 1 km in some cases. As a result, the laser-wireless-power-supply system 170 is capable of wirelessly powering the lunar rover 174 by the lunar lander 172 substantially without optical losses. In particular, in this laser-wireless-power-supply system 170, since the beam shaper 192 is disposed on the subsequent stage side of the optical apparatus 33, the intensity distributions of the transmission beams can be made uniform. Further, since there is no need to provide a configuration on the lunar rover 174 side for making the intensity distributions of the beams uniform, it is possible to reduce the weight of the lunar rover 174, which is to be powered, and reduce power consumption of the lunar rover 174.

<Application Example to Lidar Remote Sensing System>

Figure 19:
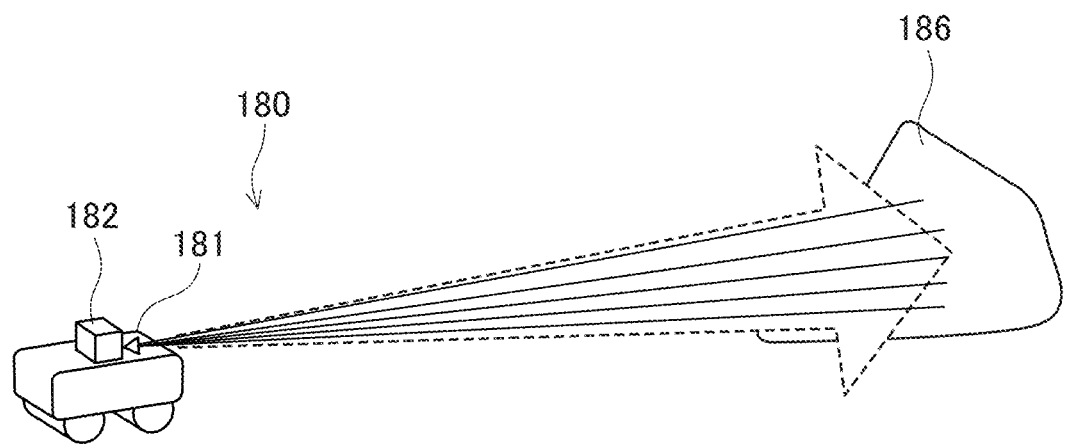
FIG. 19 is a diagram showing an Example in which an optical apparatus according to an embodiment of the present disclosure is applied to a lidar remote sensing system.

FIG. 19 is a diagram showing an Example in which an optical apparatus according to an embodiment of the present disclosure is applied to a lidar remote sensing system.

As shown in FIG. 19, a lidar remote sensing system 180 includes, for example, a movable observation vehicle 181 and an observation equipment 182 mounted on this observation vehicle 181.

Figure 20:
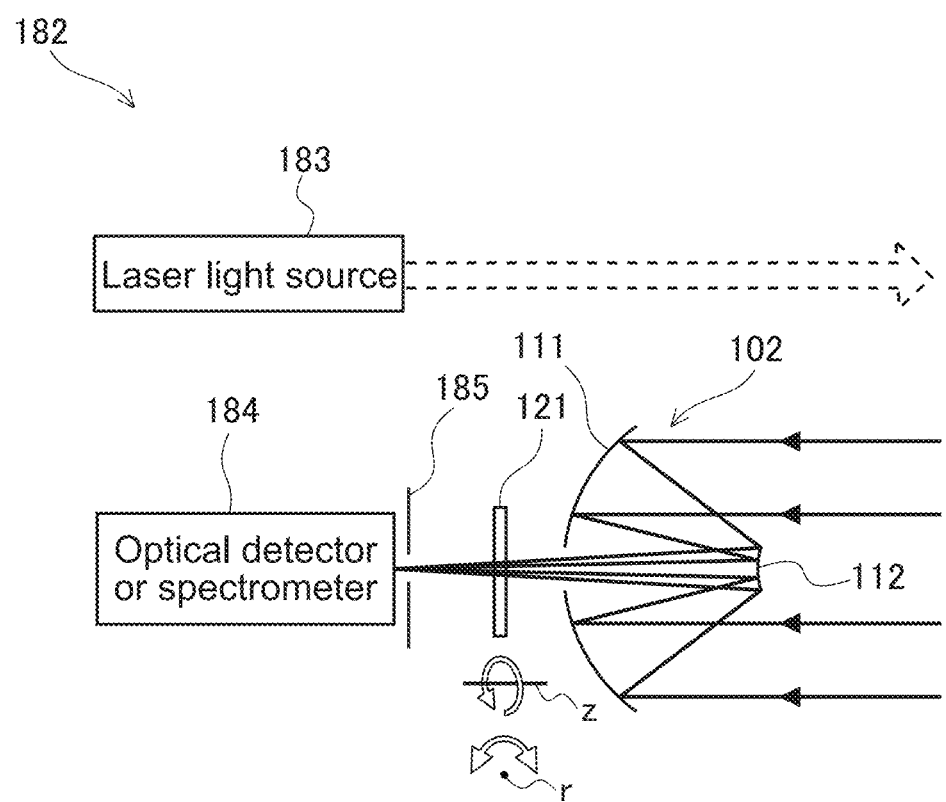
FIG. 20 is a diagram showing an internal configuration of an observation equipment shown in FIG. 19.

FIG. 20 is a diagram showing a configuration of the observation equipment 182 on which an optical apparatus according to an embodiment of the present disclosure is mounted.

As shown in FIG. 20, the observation equipment 182 includes, for example, a laser light source 183 that applies a laser beam of a single wavelength, a plurality of wavelengths, or white light toward an observed object 186 located at a distance of approximately several hundred meters to several kilometers shown in FIG. 19, an optical detector or spectrometer 184 that measures reflected and scattered light from the observed object 186, the optical apparatus 102 including a pair of the concave mirror 111 and the convex mirror 112, which are each a Cassegrain-type reflecting telescopes as shown in FIG. 9, and the parallel flat plate 121 disposed in the entrance of the optical detector or spectrometer 184, and an aperture 185 inserted between the optical detector or spectrometer 184 and the optical apparatus 102. The parallel flat plate 121 is configured to be capable of accurately selecting the light receiving direction two-dimensionally with a control system (not shown), for example. The two-dimensional direction control can be realized by, for example, combining the pivoting with respect to an arbitrary axis (r-axis) perpendicular to the optical axis (z-axis) and rotation about the optical axis (z-axis) itself. By applying the above-mentioned laser beam onto a wide-range area of the surface of the observed object 186, receiving light, and performing measurement analysis by the optical detector or spectrometer 184 while two-dimensionally selecting and sweeping the reflected and scattered light therefrom by the optical apparatus 102, it is considered that a two-dimensional map of the condition of the surface of the observed object 186 or the inside of the surface layer can be obtained. Here, the aperture 185 is used to select and limit the light receiving direction more accurately.

Note that also regarding the laser beam from the laser light source 183 in FIG. 20, the laser beam propagation direction may be two-dimensionally controlled in a form as shown in FIG. 18. That is, a specific position on the observed object 186 may be selectively irradiated, or the selected area may be swept at high speed. In this case, the optical apparatus 102 receives the reflected and scattered light from the selected irradiation area in synchronization with the sweeping, or collectively receives light in a wide range of light receiving direction.

<Experimental Results>

A laser beam transmission system with a configuration in which the focal length of the concave lens 13 is −75 mm and the focal length of the convex lens 14 is 100 mm in the optical apparatus 3 shown in FIG. 5 was designed and constructed, the parallel flat plate 23 (thickness: 1 mm, refractive index: approximately 1.5) was attached to an angle-tunable kinematic mount whose trade name is "KC2-T-M" (Thorlabs, Inc.), and an experiment for demonstrating the accuracy of the laser light-propagation-direction controller was conducted. The knob of "KC2-T-M" is threaded at 100 TPI (Threads per inch) and can be angularly adjusted to 3.36 mrad per knob rotation. By 5 knob rotations, the angular change is 16.8 mrad.

Figure 21:
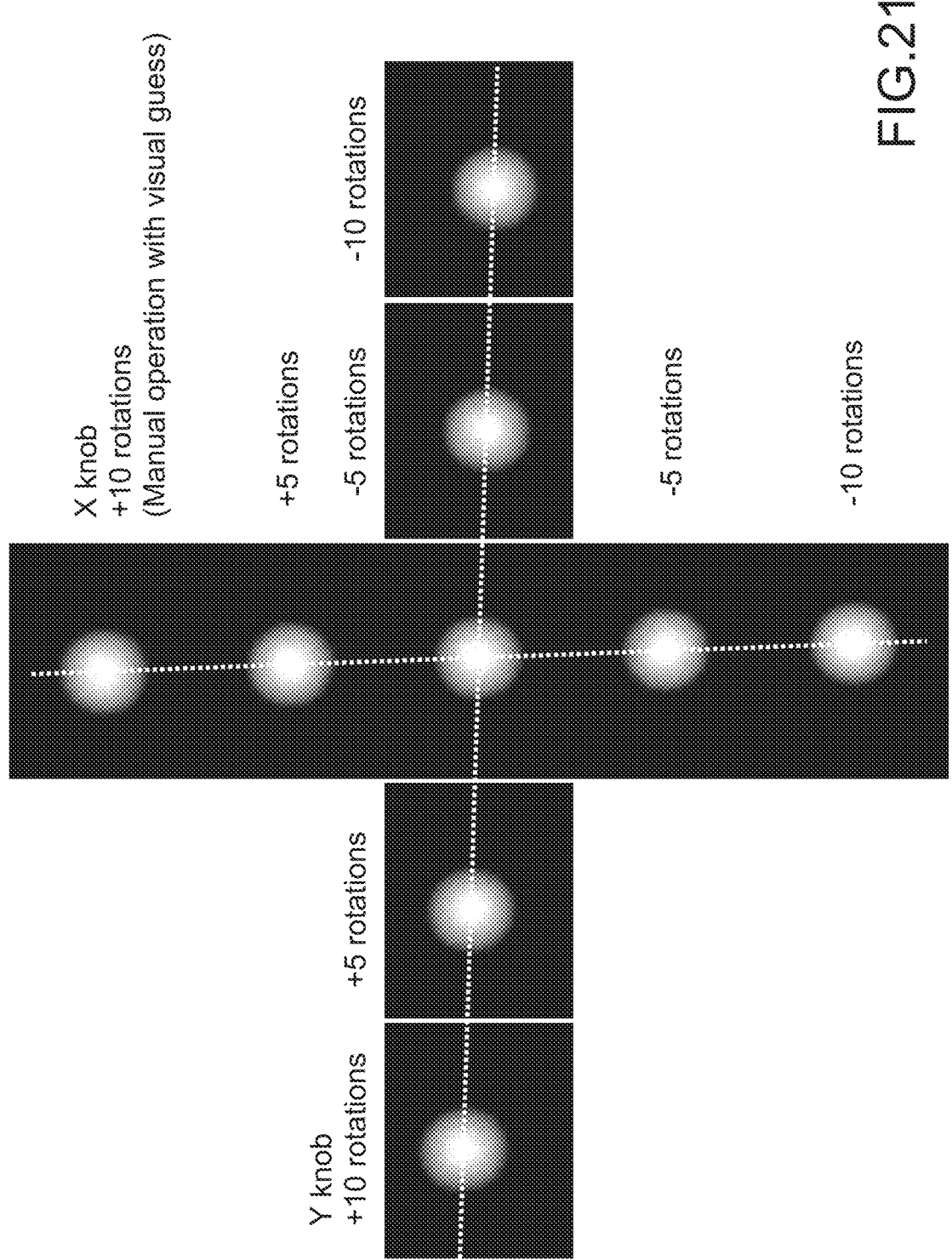
FIG. 21 shows an experimental result for demonstrating the accuracy of a beam direction controller according to an embodiment of the present disclosure, showing a beam image at an 800-m transmission destination when an adjusting knob of the two-axis holder for holding an optical parallel flat plate is rotated a predetermined number of times.
Figure 22:
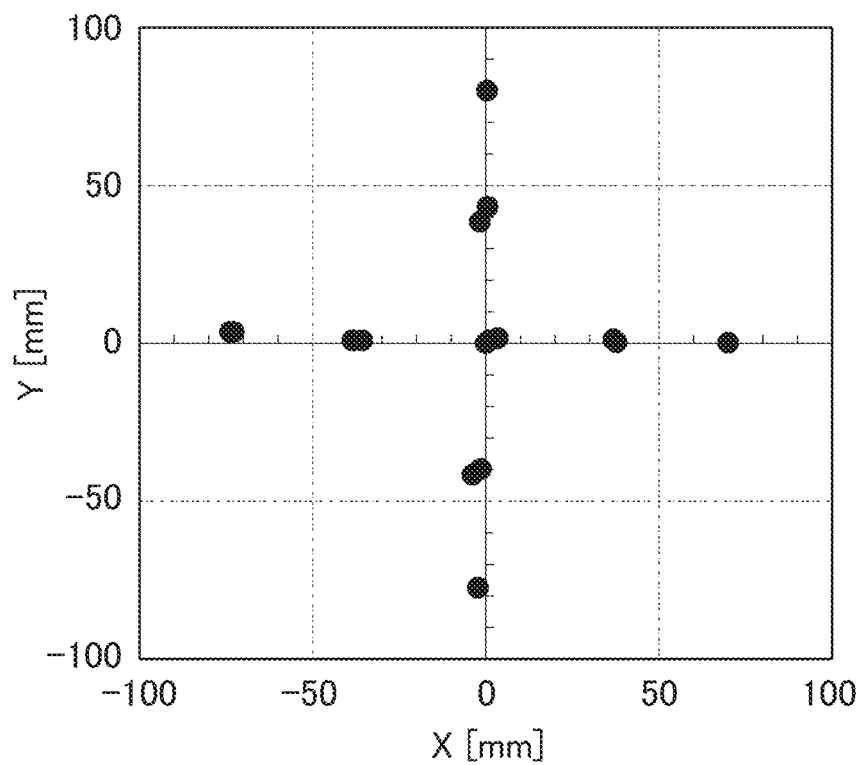
FIG. 22 shows an experimental result for demonstrating the accuracy of a beam direction controller according to an embodiment of the present disclosure, indicating the amount (in units of mm) of change in the position of the beam barycenter at an 800-m transmission destination.
Figure 23:
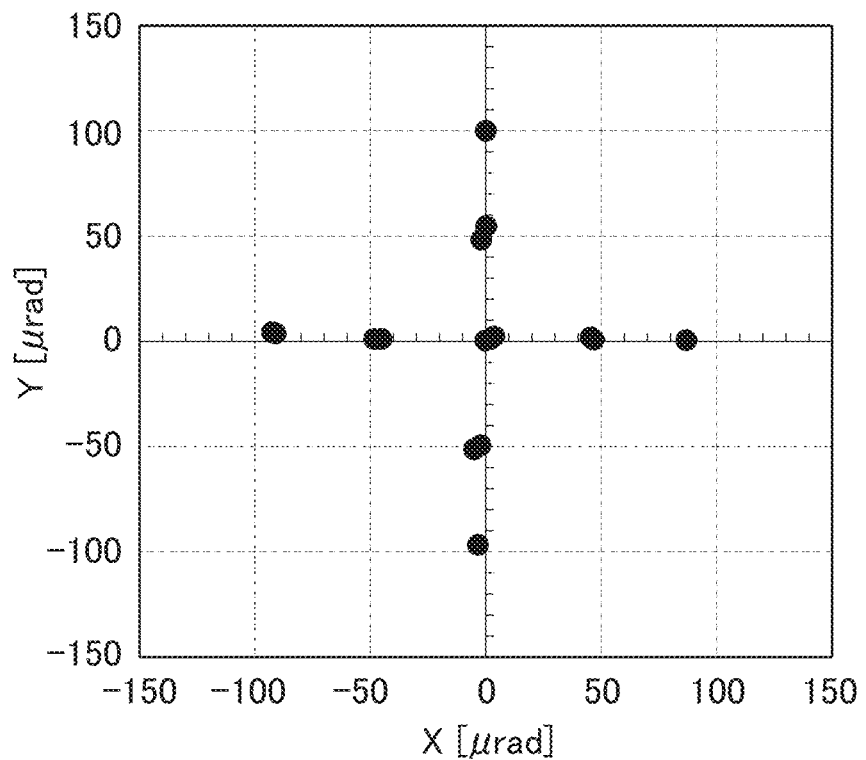
FIG. 23 shows an experimental result for demonstrating the accuracy of a beam direction controller according to an embodiment of the present disclosure, indicating the amount (in units of μrad) of change in the position of the beam barycenter (light propagation direction angle viewed from the laser transmitter side) at an 800-m transmission destination.

In this experimental system, the output power of the laser light source was set to approximately 250 mW, and the beam image after the transmission of 800 m was observed. FIG. 21 shows the beam image at the 800 m transmission destination when the laser beam propagation direction is swept up, down, left, and right from the central position by manually operating the "KC2-T-M" (knob: ±5, 10 rotations). In addition, the amount of change in the position of the beam barycenter at the 800-m transmission destination is shown in FIG. 22, and the amount of change in the light propagation direction angle as viewed from the light transmission side equipped with the optical apparatus 3 corresponding thereto is shown in FIG. 23. Note that in FIG. 22 and FIG. 23, measurement data points for a plurality of times are superimposed and displayed.

These experimental results demonstrated that the direction of the beam barycenter can be controlled with accuracy of at least ±10 µrad or less, including reproducibility. This corresponds to that the deviation of the position of the beam barycenter at 1 km ahead is ±10 mm or less.

Note that it is also confirmed that the temporal fluctuation of the position of the beam barycenter in the present measurement is several µrad or less from the results of measurement of a plurality of times with the fixed direction controller. It is considered that slight fluctuation of the transmission path atmosphere and noise of the measuring system are the dominant factors for this value, and the contribution of the oscillation of the optical transmitter is negligible because of the high vibration resistance that is a characteristic of an embodiment of the present disclosure.

<Others>

The present disclosure is not limited to the above-mentioned embodiments, and various modifications and applications can be made within the scope of the technical concept of the present invention, and the scope of implementation of such modifications and applications also belong to the technical scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An optical apparatus, comprising:
   a condensing optical part having a focal point; and
   an optical element that is inserted between the condensing optical part and the focal point and capable of shifting, in a direction perpendicular to an optical axis, the apparent focal point as viewed from a side of the condensing optical part.

2. The optical apparatus according to claim 1, wherein the optical element includes a transmissive optical parallel flat plate that is pivotable with respect to the optical axis.

3. The optical apparatus according to claim 2, wherein the condensing optical part is a collimator including one of one or more lenses and one or more reflecting mirrors.

4. The optical apparatus according to claim 3, wherein the reflecting mirror is a reflective telescope having a diameter of 50 mm or more.

5. The optical apparatus according to claim 2, wherein the condensing optical part is one of an optical relay system and a beam-diameter converter, the one of an optical relay system and a beam-diameter converter including one of one or more lenses, one or more reflecting mirrors, and a combination of one or more lenses and one or more reflecting mirrors.

6. The optical apparatus according to claim 5, wherein the reflecting mirror is a reflective telescope having a diameter of 50 mm or more.

7. The optical apparatus according to claim 2, wherein the parallel flat plate is pivotable in two axes perpendicular to each other.

8. The optical apparatus according to claim 1, wherein the optical element is disposed to have a predetermined inclination angle with respect to the optical axis and includes a transmissive optical parallel flat plate having a variable refractive index.

9. The optical apparatus according to claim 1, wherein the optical element includes a first transmissive optical parallel flat plate pivotable about a first axis that is a rotation axis perpendicular to the optical axis, and a second transmissive optical parallel flat plate pivotable about a second axis that is a rotation axis perpendicular to the optical axis and the first axis.

10. The optical apparatus according to claim 1, wherein the optical element includes a first transmissive optical parallel flat plate that is disposed to have a predetermined inclination angle with respect to a first axis perpendicular to the optical axis and has a variable refractive index, and a second transmissive optical parallel flat plate that is disposed to have a predetermined inclination angle with respect to a second axis perpendicular to the optical axis and the first axis and has a variable refractive index.

11. The optical apparatus according to claim 1, wherein the optical element includes two or more transmissive optical parallel flat plates that are independently pivotable with respect to the optical axis.

12. The optical apparatus according to claim 1, wherein the optical element includes two or more transmissive optical parallel flat plates that are disposed to have a predetermined inclination angle with respect to the optical axis and have a variable refractive index.

13. The optical apparatus according to claim 1, further comprising
a beam shaper disposed on a side of the condensing optical part opposite to a side where the optical element is disposed.

14. A light-propagation-direction controller, comprising:
an optical apparatus which has
a condensing optical part having a focal point; and
an optical element that is inserted between the condensing optical part and the focal point and capable of shifting, in a direction perpendicular to an optical axis, the apparent focal point as viewed from a side of the condensing optical part.

* * * * *